US007090735B2

(12) United States Patent
Neugebauer et al.

(10) Patent No.: US 7,090,735 B2
(45) Date of Patent: Aug. 15, 2006

(54) METHOD OF COMPENSATING FOR RESIDUAL ALIGNING TORQUE (RAT)

(75) Inventors: Paul M. Neugebauer, Akron, OH (US); John L. Turner, Akron, OH (US); Stephen M. Vossberg, Medina, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/922,964

(22) Filed: Aug. 6, 2001

(65) Prior Publication Data

US 2003/0029535 A1  Feb. 13, 2003

(51) Int. Cl.
*B29D 30/00* (2006.01)
*B60C 11/12* (2006.01)
*G06F 17/50* (2006.01)

(52) U.S. Cl. .............................. 156/110.1; 152/209.23; 152/902; 152/DIG. 3; 703/6; 703/8

(58) Field of Classification Search ........... 152/209.18, 152/209.23, 209.24, 902, DIG. 3; 156/110.1; 703/6, 8
See application file for complete search history.

(56) References Cited

U.S. PATENT DOCUMENTS

| 2,339,558 | A |   | 1/1944  | Hale              |          |
|-----------|---|---|---------|-------------------|----------|
| 4,298,046 | A |   | 11/1981 | Herbelleau et al. |          |
| 4,385,654 | A |   | 5/1983  | Sumikawa et al.   |          |
| 4,423,760 | A |   | 1/1984  | Treves et al.     |          |
| 4,449,560 | A |   | 5/1984  | Tansei et al.     |          |
| 4,566,514 | A |   | 1/1986  | Maiik et al.      |          |
| 4,598,747 | A |   | 7/1986  | Flechtner         |          |
| 4,936,363 | A |   | 6/1990  | Schuster et al.   |          |
| 5,031,680 | A | * | 7/1991  | Kajikawa et al.   | 152/902  |
| 5,131,444 | A |   | 7/1992  | Kukimoto et al.   |          |
| 5,293,915 | A |   | 3/1994  | Tsuda et al.      |          |
| 5,323,825 | A |   | 6/1994  | Yamagishi et al.  |          |
| 5,343,919 | A |   | 9/1994  | Yoshida           |          |
| 5,345,988 | A |   | 9/1994  | Kabel et al.      |          |
| 5,431,208 | A | * | 7/1995  | Aoki et al.       | 152/DIG. 3 |
| 5,538,060 | A | * | 7/1996  | van der Meer et al. |        |
| 5,643,374 | A |   | 7/1997  | Matsumoto         |          |
| 5,669,993 | A | * | 9/1997  | Moseley et al.    |          |
| 5,714,026 | A | * | 2/1998  | Wakabayashi       |          |
| 5,733,393 | A |   | 3/1998  | Hubbell et al.    |          |
| 5,795,415 | A |   | 8/1998  | Campana et al.    |          |
| 5,814,169 | A |   | 9/1998  | Yamaguchi et al.  |          |
| 5,944,082 | A |   | 8/1999  | Thompson et al.   |          |
| 5,950,700 | A |   | 9/1999  | Fukuoka           |          |
| 5,960,845 | A | * | 10/1999 | Wada              |          |
| 6,000,450 | A | * | 12/1999 | Kishimoto et al.  | 152/DIG. 3 |
| 6,343,636 | B1|   | 2/2002  | Hanya et al.      |          |

(Continued)

FOREIGN PATENT DOCUMENTS

DE    4107547    *  9/1991

(Continued)

*Primary Examiner*—Steven D. Maki
(74) *Attorney, Agent, or Firm*—Oliff & Berridge, PLC

(57) ABSTRACT

A method for changing the residual aligning torque (RAT) of a pneumatic tire by forming angled sipes in certain of the tread blocks in at least a pair of circumferentially extending ribs, each rib being located on an opposite side of the mid-circumferential plane of the tire. The sipes in the tread blocks in one of the ribs are formed at an inclined angle opposite to the inclined angle of the sipes in the tread blocks in the opposite rib. The RAT can also be changed by varying the depth and width of the opposed angled sipes.

11 Claims, 4 Drawing Sheets

U.S. PATENT DOCUMENTS 6,531,012 B1 * 3/2003 Ishiyama ............ 156/110.1
6,697,772 B1 * 2/2004 Mancosu et al. ........ 156/110.1

FOREIGN PATENT DOCUMENTS

| | | | |
|---|---|---|---|
| DE | 19506697 | * | 8/1996 |
| EP | 0 668 173 A1 | | 8/1995 |
| EP | 0 761 479 A2 | | 3/1997 |
| EP | 810104 | * | 12/1997 |
| EP | 1 013 480 A1 | | 6/2000 |
| EP | 1020306 | * | 7/2000 |
| EP | 1072445 | * | 1/2001 |
| JP | 57-104404 | * | 6/1982 |
| JP | 63-97405 | * | 4/1988 |
| JP | 4-100706 | * | 4/1992 |
| JP | 10-138715 | * | 5/1998 |
| JP | 11-240314 | * | 9/1999 |
| WO | WO 98/29270 | * | 9/1998 |

* cited by examiner

METHOD OF COMPENSATING FOR RESIDUAL ALIGNING TORQUE (RAT)

BACKGROUND OF THE INVENTION

1. Technical Field

The invention relates to pneumatic tires and in particular to pneumatic tires having sipes formed in certain of the tread blocks forming a pair of circumferentially extending ribs located on opposite sides of a mid-circumferential plane of the tire. More particularly, the invention relates to forming the sipes at angles in the tread blocks in a slanted forward direction in one of the ribs and in the opposite slanted reverse direction in the other of said ribs to make changes in the residual aligning torque (RAT) without changing the carcass or road contacting tread pattern of the tire.

2. Background Information

Pneumatic tires such as used for passenger and light trucks, have a tread pattern which extends circumferentially about the tire. The tread consists of a plurality of circumferentially and laterally extending grooves which divide the tread into generally circumferentially extending ribs formed by a plurality of either continuous or discontinuous tread blocks. Many of the tread blocks are formed with very narrow slots or slits commonly referred to as sipes. These sipes are formed by thin metal strips placed in the mold, referred to as sipe blades. These sipes provide various traction and stiffness characteristics to the tread blocks which provides certain ride and handling characteristics for the vehicle.

Even when the ribs of a tire are spaced symmetrical with respect to the mid-circumferential plane of the tire, they can produce a moment on the tread at the contact patch with the roadway, causing a twisting force on the tire. This moment provides a tendency for the vehicle to drift left or right when the steering wheel is released. This moment or force at the contact patch is referred to as residual aligning torque (RAT). The effect of this twisting moment and a detailed discussion relating to the various factors thereof and prior attempts to reduce or eliminate the same, is disclosed in detail in U.S. Pat. No. 5,944,082, the contents of which are incorporated herein by reference. The tire construction and method set forth in U.S. Pat. No. 5,944,082 provides draft angles in lateral grooves of certain ribs, which angles are sloped forward on one side of the mid-circumferential plane and sloped backward on the opposite side of the plane. These sloped grooves allegedly result in the tread blocks sloping forward and backward during forward motion of the vehicle which induces a torque to compensate for the inherent residual aligning torque due to the tread pattern.

U.S. Pat. No. 5,944,082 states that the siping in tread blocks is usually not wide enough to allow effective rolling radius changes before adjacent blocks come into contact and that the friction between sipes frequently locks the sipes together canceling the effect to be achieved. It concludes that inclined sipes on the rolling circumference of the rib are usually negligible and not predictable. However, the method of the present invention of forming the tire with oppositely sloped sipes has been found to achieve satisfactory results in affecting the residual aligning torque not believed possible in the tread pattern of U.S. Pat. No. 5,944,082.

SUMMARY OF THE INVENTION

The present invention provides a method for forming a pneumatic tire having a plurality of circumferentially extending ribs formed by a plurality of tread blocks, in which certain of the tread blocks, in at least a pair of ribs located on opposite sides of the mid-circumferential plane of the tire, have angled sipes which are angled in a forward direction in one of the ribs and in an opposite rearward direction in the other of the ribs.

Another feature of the invention is the ability to make changes in the residual aligning torque (RAT) without changing the carcass or road contacting tread pattern by forming the tire tread blocks with angled sipes extending in the fore and aft directions in opposing ribs of the tire tread pattern.

Still another feature of the invention is forming the sipes with various heights and tapers to achieve a desired aligning moment and effect on the RAT, and in which the width and depth of the sipes can be varied to effect this change in RAT.

Another feature of the invention is to provide a method of forming a pneumatic tire having angled sipes in which the sipes are formed during molding of the tire by utilizing sipe blades in a usual mold without requiring substantial changes to the molding process or materially increasing the cost of the tire.

Another aspect of the method of the invention is forming the sipes to extend in a generally lateral direction with respect to the mid-circumferential plane of the tire, perpendicular thereto or at various angles, or providing the sipes with various shapes such as zig-zag, in order to achieve various changes in the RAT depending on the particular tread pattern of the tire.

A still further feature of the method is to provide the angled sipes either with a full or partial width with respect to the lateral width of the tread block, and varying the depth of the sipe to extend partially into the tread block or completely to the base of the tread block.

At least one sipe within each tread block extends from one side of the block and across the center of the block to the other side of the block.

The foregoing advantages, construction, operation and method steps of the present invention will become more readily apparent from the following description and the accompanying drawings.

DESCRIPTION OF THE PREFERRED EMBODIMENTS

Figure 1:
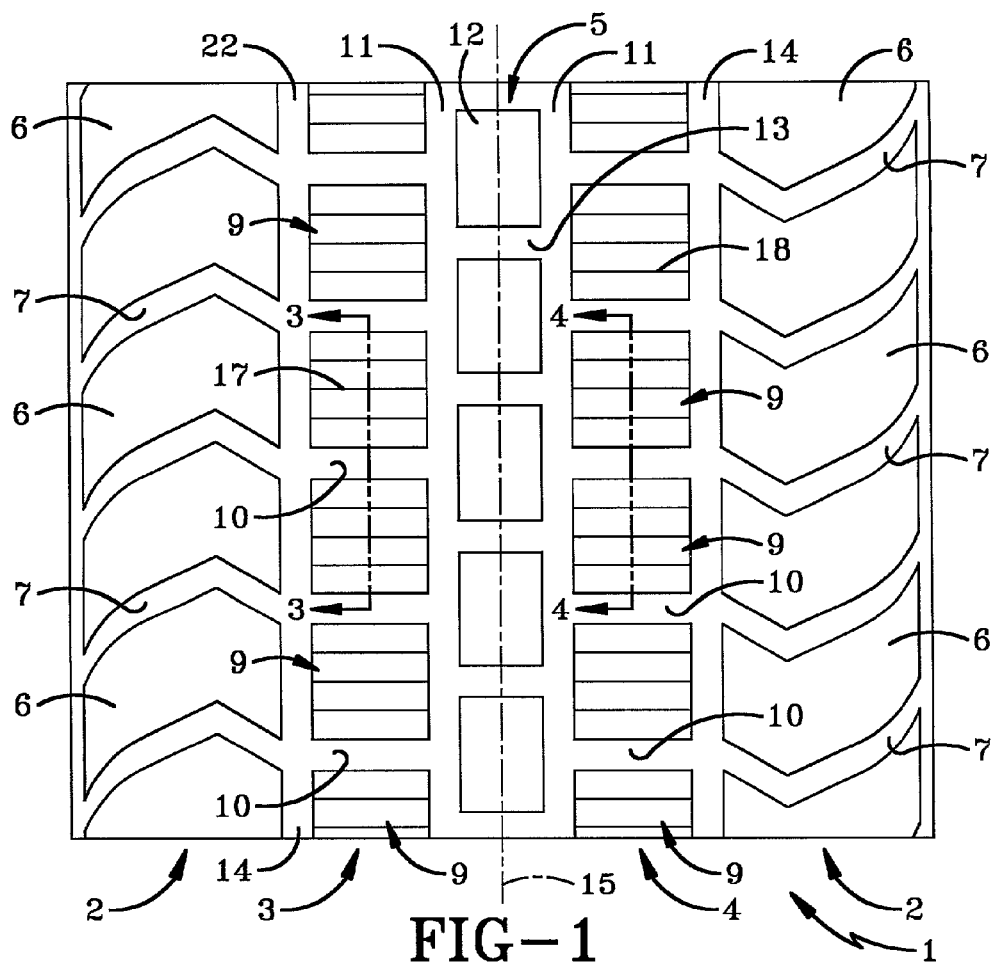
FIG. 1 is a diagrammatic plan view of a tire tread containing the angled sipes formed by the method of the present invention.
Figure 2:
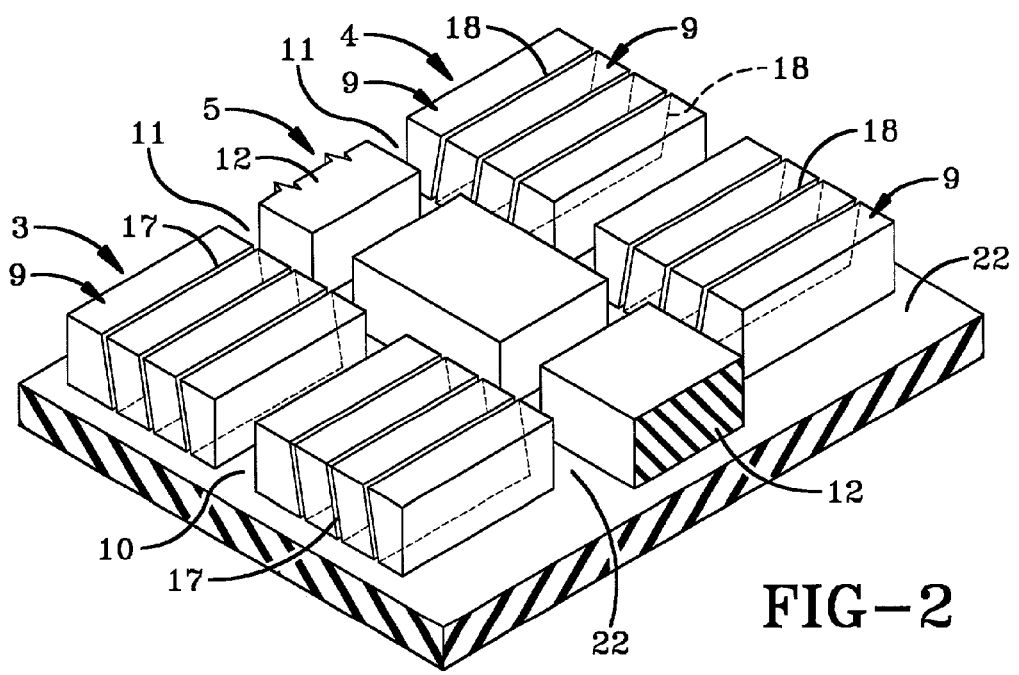
FIG. 2 is an enlarged diagrammatic perspective view with portions in section of adjacent tread blocks in two intermediate ribs having the angled sipes formed therein.

FIG. 1 is a plan view of a portion of a pneumatic tread pattern indicated generally at 1, which includes a pair of shoulder ribs 2, a pair of intermediate ribs 3 and 4 and a center rib 5. Each rib 2 is formed by a plurality of tread blocks 6 separated by generally V-shaped grooves 7. If desired grooves 7 could be continuously curved or have multiple angles in addition to the double angle of the V-shape groove as shown. Each intermediate rib 3 and 4 is formed by a plurality of tread blocks 9 separated by laterally extending grooves 10. Center rib 5 is formed by a plurality of circumferentially spaced tread blocks 12 separated by lateral grooves 13. Circumferentially extending grooves 11 and 14 separate rib 3 from rib 5 and rib 4 from rib 5 respectively. The particular shapes of the tread blocks shown in FIG. 1 can vary without affecting the concept of the invention as well as the various directions and shapes of the intervening grooves. However, the leading and trailing sidewalls of the tread blocks are symmetrical with respect to a radial plane which passes through a midpoint of the tread block as shown particularly in FIGS. 2–5 and 9 of the drawings. Likewise, the various ribs can have the tread blocks integrally connected to form a continuous rib as opposed to the discontinuous figuration of the ribs as shown in FIG. 1. Ribs 2, 3, and 4 are spaced generally symmetrical about a mid-circumferential plane 15 of the tread pattern.

Figure 4:
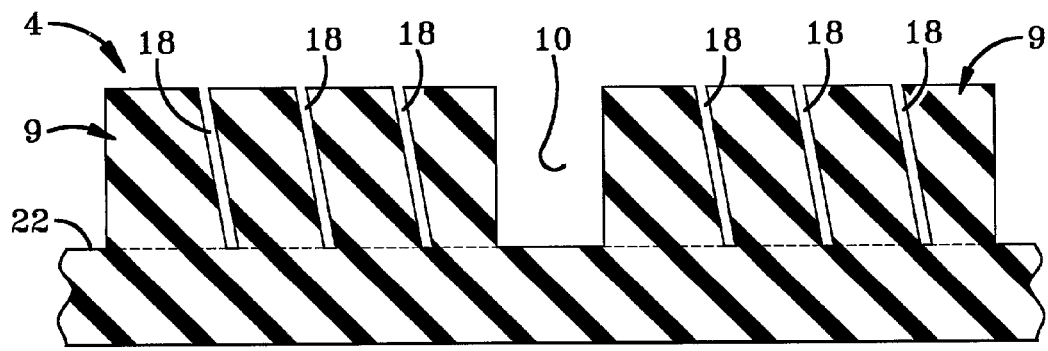
FIG. 4 is an enlarged fragmentary sectional view taken on line 4—4, FIG. 1.
Figure 5:
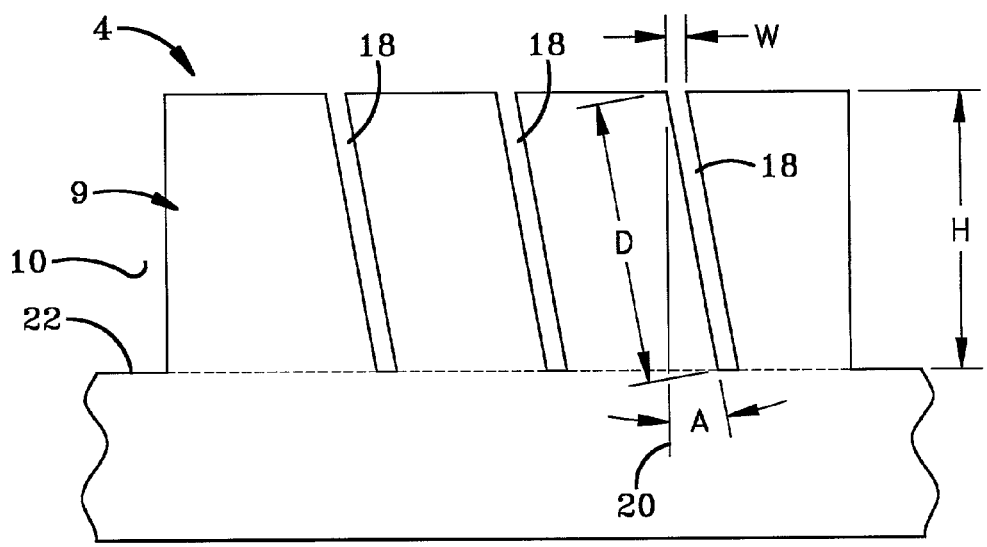
FIG. 5 is a further enlarged view of the angled sipes in one of the tread blocks of FIG. 4.

In accordance with the invention, sipes 17 and 18 are formed in tread blocks 9 and extend at an angle A (FIG. 5) with respect to a plane indicated at 20 in FIG. 5, which extends generally perpendicular to the tread block and in a generally radial direction through the axis of rotation of the tire. Sipes 17 in tread blocks 9 of rib 3 are slanted at the same angle, but in an equal and opposite direction with respect to plane 20 to that of sipes 18 of rib 4 as shown in FIG. 4. Sipes 17 and 18 preferably will have the same width W and the same depth D.

Figure 3:
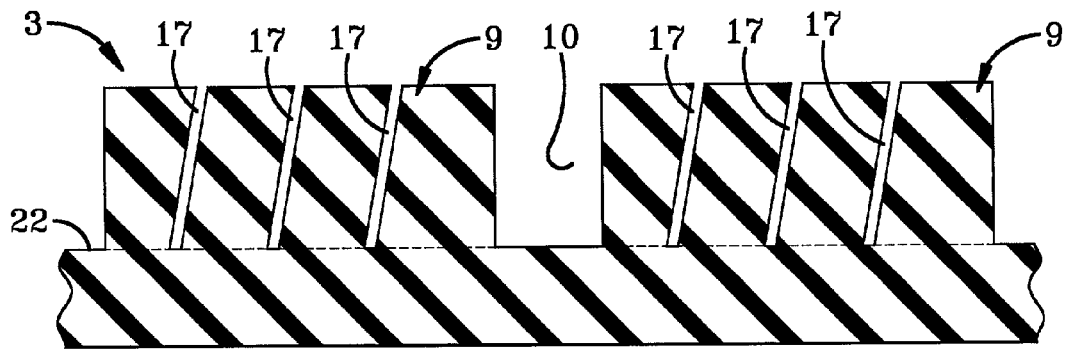
FIG. 3 is an enlarged fragmentary sectioned view taken on line 3—3, FIG. 1.
Figure 6:
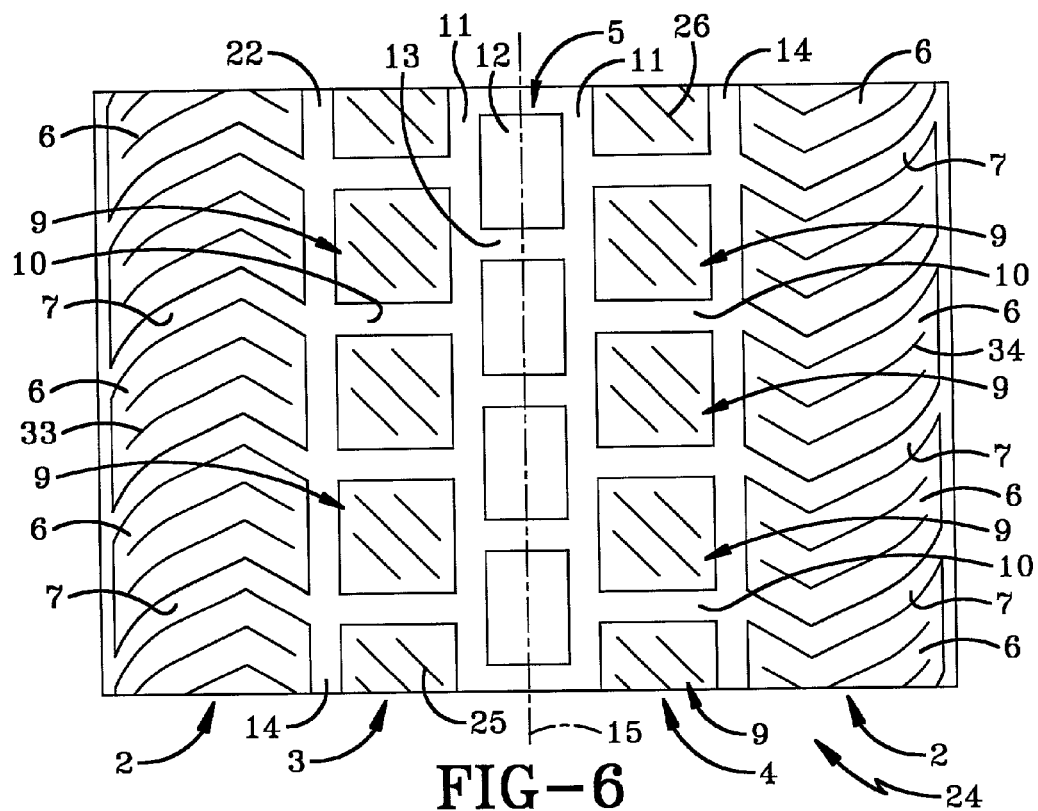
FIG. 6 is a diagrammatic plan view similar to FIG. 1 showing the method of the present invention forming a modified sipe configuration.

In a preferred embodiment, sipes 17 and 18 will be formed with a width in the range of between 0.015 and 0.06 inches with the preferred width being approximately 0.03 inches. Depth D will be within the range of 20% and 100% of the height H of the tread block. Angle A will be within the range of 2° and 15° with the preferred angle being approximately 7°. Thus, the sipes can extend completely to groove bottom surface 22 or only partially thereto without affecting the concept of the invention so long as the sipes in opposite ribs 3 and 4 have the same angle of inclination, but in opposite directions, and substantially the same depth and width so as to be similar, but opposite to each other. Although three sipes are shown in each of the tread blocks in FIG. 1, this number can vary so long as substantially the same number of sipes are formed in each tread block. The sipes need not extend perpendicular to mid-circumferential plane 15 as shown in FIG. 1, but can extend at an angle thereto as shown in modified tread pattern 24 in FIG. 6. FIG. 6 shows sipes 25 and 26 formed in tread blocks 9 extending at an angle with respect to mid-circumferential plane 15. Again, the same number of sipes will be formed in each tread block 9, but sloped in opposite directions as shown in FIGS. 3 and 4.

Figure 7:
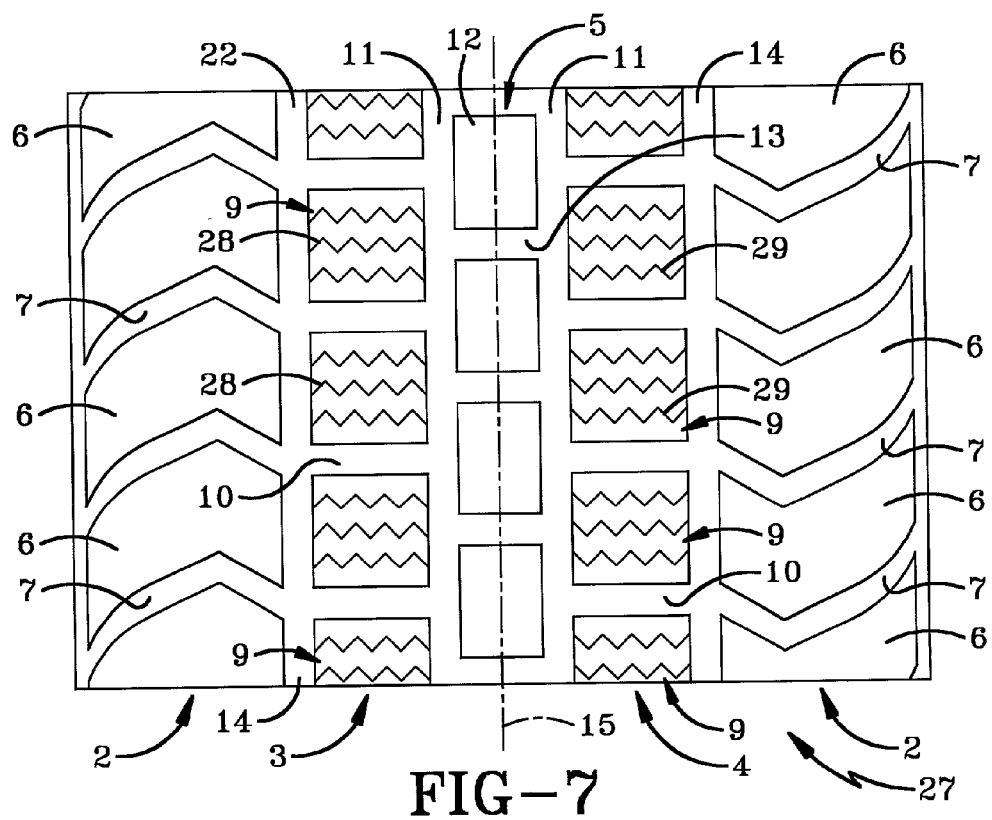
FIG. 7 is a plan view similar to FIGS. 1 and 6 showing another tread pattern having a modified sipe configuration.

FIG. 7 shows another modified tread pattern 27 in which sipes 28 and 29 have a zig-zag configuration and are symmetrical to each other except that the sipes will be slanted in opposite directions with respect to those in the opposite rib as discussed above.

The tread pattern of FIG. 6 also shows the formation of angled sipes 33 and 34 in shoulder ribs 2, which again are of equal and opposite angles and depths to each other in the respective opposite ribs with respect to plane 15.

Figure 8:
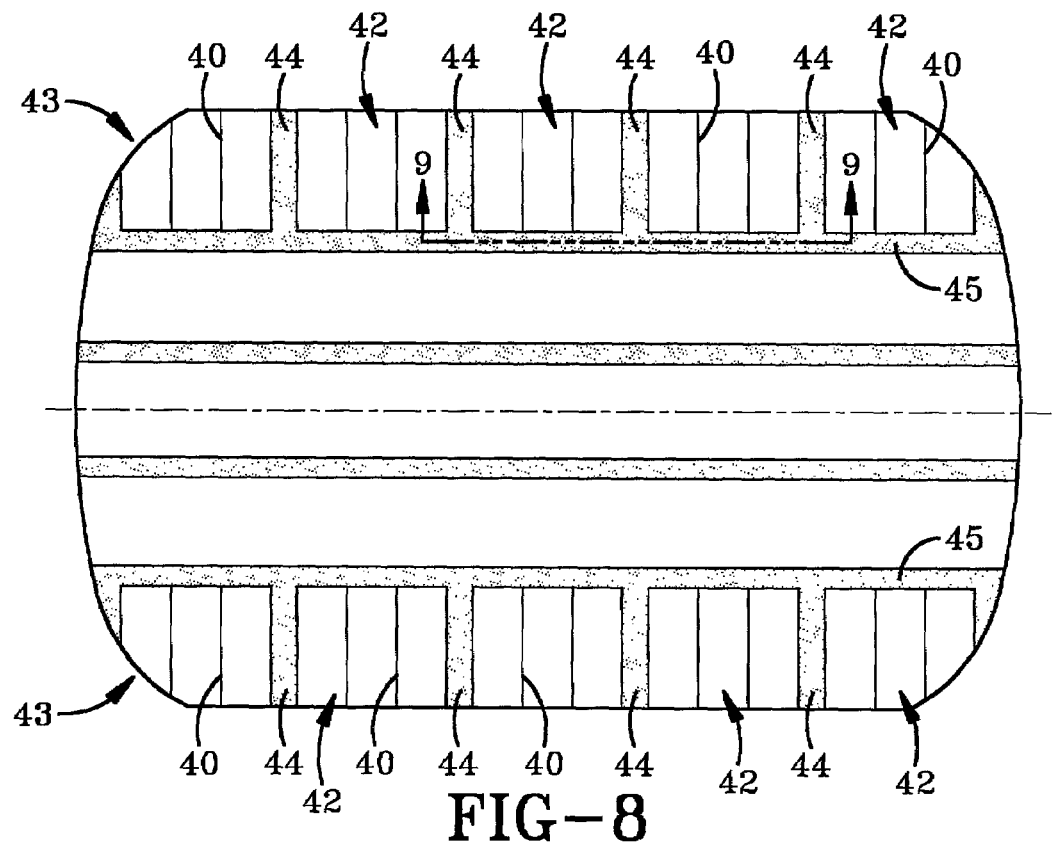
FIG. 8 is a diagrammatic plan view of a test tire tread proving that changes in RAT are achieved with the angled sipes.
Figure 9:
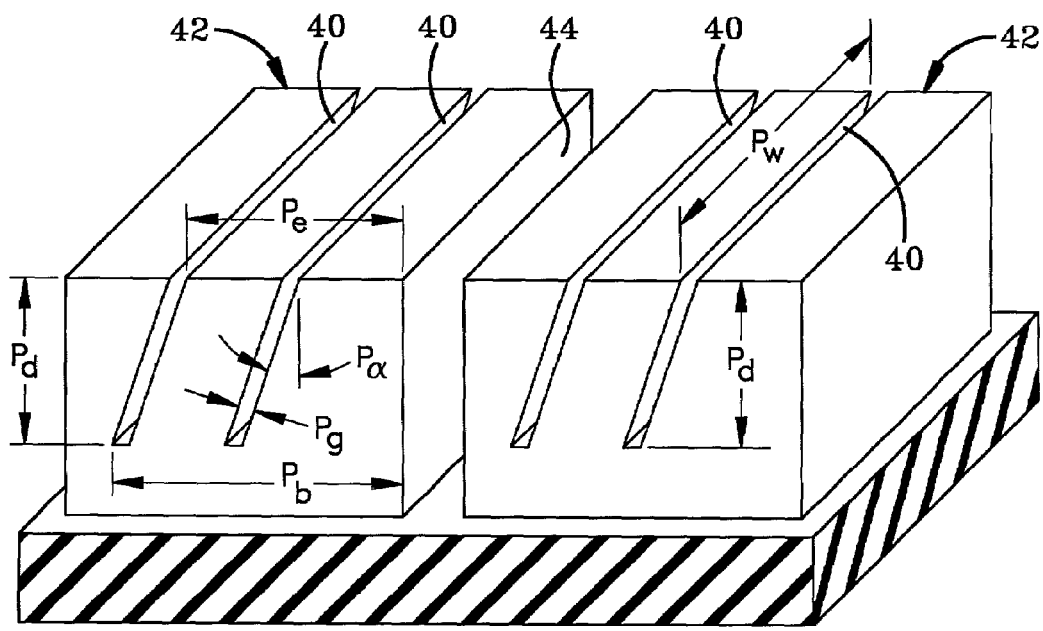
FIG. 9 is an enlarged perspective view of two of the test tread blocks of FIG. 8.

Tests have been performed to prove that the angled sipes do affect the residual aligning torque shown diagrammatically in FIGS. 8 and 9.

FIG. 8 is a diagrammatic foot print of an actual test tire which proved that a change in RAT can be achieved by providing angled sipes and by varying both the depth and angle of the sipes in the tread blocks. Set forth below is Chart One which was developed by Finite Element Analysis (FEA) in order to mathematically determine what, if any effect the angled sipes would have on the RAT.

In the test tire of FIG. 8, sipes 40, two of which are formed in each tread block 42, were provided in shoulder ribs 43. Blocks 42 were formed by lateral grooves 44 and circumferential grooves 45. The various parameters which were considered and which could effect the change in RAT are shown in FIG. 9. These parameters include Pd (radial sipe depth); Pg (sipe gauge or width); Pb (distance of sipe base to leading edge); Pe (distance of sipe opening to leading edge); Px (sipe angle of inclination); and Pw (sipe lateral width).

CHART ONE

| Sipe Angle | Compressive Force (lbs) | Circumferential Direction Thrust/Element (lbs) | Net RAT N-m | Anticipated Result On Tire N-m |
|---|---|---|---|---|
| 0 | 63.25 | 0.0 | 0 | 0.0 |
| 5 | 62.98 | 1.46 | 4 | 1.89 |
| 10 | 62.17 | 2.88 | 8 | 3.69 |

Actual tests were then performed on two tires which had the parameters set forth in Chart Two and shown in FIG. 9.

CHART TWO

| Sipe Angle (degrees) | Measured RAT N-m | Net Angled Tie Bar RAT Effect (N-m) |
|---|---|---|
| −7 | −5.52 | −1.93 |
| No Sipes | −3.59 | — |
| 7 | −1.77 | 1.82 |

The FEA calculations showed that the projected sensitivity to the sipe inclination angle is about 0.37 N-m/° inclination angle. The actual measured change in RAT obtained from the test results in Chart Two showed a change in RAT of 0.28 N-m/° inclination angle. It is believed that the main reason for the difference between the model affect and the actual affect on the test tires is in the material properties of the tread compound and the loading corrections on the tire. Most importantly, the test results show there is a definite change in RAT by providing angled sipes in the tread blocks and that various changes in RAT can be achieved by varying the sipe angle and that the amount of desired change in RAT can be determined to some degree of certainty by FEA as set forth in Chart One.

Thus, a tire manufacturer can change the RAT of a tire easily by providing angled sipe blades in the mold and can arrive at a projected amount of change initially through FEA which then can be incorporated into an actual tire for subsequent testing. Thus, FEA avoids the more expensive and time consuming production of samples and actual testing of tires in order to arrive at the desired change of RAT since a change in RAT can be pre-calculated.

While the embodiments in the invention has been described, the invention is not limited thereto. The claims of the invention follow.

The invention claimed is:

1. A method of manufacturing a pneumatic tire, comprising:

providing a circumferentially extending tread pattern of a pneumatic tire with at least first and second circumferentially extending ribs, said ribs being located on opposite sides of a mid-circumferential plane of said tire, each rib containing a plurality of tread blocks separated by laterally extending grooves, said tread blocks having sipes, said tread blocks having leading and trailing sidewalls symmetrical with respect to a first radial plane passing through a midpoint of said tread blocks and through an axis of rotation of the tire;

varying an angle of inclination of the sipes with respect to a second radial plane passing through an outermost surface of the tread block and adjacent to the sipe and through an axis of rotation of the tire to change a residual aligning torque of the pneumatic tire until a desired residual aligning torque is achieved and such that an angled sipe is formed in each of the tread blocks, each angled sipe extending for a sipe lateral width and a radial depth at a substantially constant sipe angle of inclination between 2° and 15° with respect to the second radial plane passing through the outermost surface of the tread block and adjacent to the sipe and through the axis of rotation of the tire;

wherein all sipes within said rib tread blocks on a first side of the mid-circumferential plane extend, at a first sipe angle of inclination with respect to said second radial plane for the sipe lateral width and the radial sipe depth, at least one sipe within each tread block on the first side of the mid-circumferential plane extending from one side of the block and across the center of the block to the other side of the block, wherein all sipes within said rib tread blocks on a second side of the mid-circumferential plane extend, at a second sipe angle of inclination with respect to said second radial plane that is substantially equal to and opposite the first sipe angle for the sipe lateral width and the radial sipe depth, at least one sipe within each tread block on the second side of the mid-circumferential plane extending from one side of the block and across the center of the block to the other side of the block, and forming a pneumatic tire such that said pneumatic tire has said angled sipes in said tread pattern.

2. The method of claim 1, wherein the first and second ribs are located equidistant on opposite sides of the mid-circumferential plane.

3. The method of claim 1, wherein the angle of the sipes in the first and second ribs is 7°.

4. The method of claim 1, wherein the sipes have a depth of between 20% and 100% of the height of the tread blocks.

5. The method of claim 1, wherein the sipes are substantially perpendicular to the mid-circumferential plane of the tire.

6. The method of claim 1, wherein the sipes are formed at an angle with respect to the mid-circumferential plane of the tire.

7. The method of claim 1, wherein the sipes have a zig-zag pattern.

8. The method of claim 1, wherein the sipes are formed in opposed shoulder ribs of the tire.

9. The method of claim 1, wherein the sipes are formed in opposed intermediate ribs of the tire.

10. The method of claim 1, wherein the sipes extend fully across the lateral width of the tread blocks.

11. The method of claim 1, wherein certain of the laterally extending grooves have a generally V-shaped configuration.

* * * * *